M. E. HOVEY.
COOKING UTENSIL.
APPLICATION FILED MAR. 25, 1910.

966,210.

Patented Aug. 2, 1910.

WITNESSES
Edwin Frey
K. H. Butler

INVENTOR
M. E. HOVEY,
By
Attorneys

UNITED STATES PATENT OFFICE.

MARY E. HOVEY, OF McKEES ROCKS, PENNSYLVANIA.

COOKING UTENSIL.

966,210.  Specification of Letters Patent.  Patented Aug. 2, 1910.

Application filed March 25, 1910. Serial No. 551,458.

*To all whom it may concern:*

Be it known that I, MARY E. HOVEY, a citizen of the United States of America, residing at McKees Rocks, in the county of Allegheny and State of Pennsylvania, have invented certain new and useful Improvements in Cooking Utensils, of which the following is a specification, reference being had therein to the accompanying drawing.

This invention relates to a cooking utensil and the object thereof is to provide a utensil of such class in a manner as hereinafter set forth whereby liquid as well as solid or semi-solid foods can be cooked simultaneously.

Further objects of the invention are to provide a cooking utensil which shall be simple in its construction and arrangement, strong, durable, efficient in use, easily handled and inexpensive to manufacture.

With the foregoing and other objects in view the invention consists of the novel construction, combination and arrangement of parts as hereinafter more specifically described and illustrated in the accompanying drawings wherein is shown one embodiment of the invention, but it is to be understood that changes, variations and modifications can be resorted to which come within the scope of the claim hereunto appended.

In the drawings wherein like reference characters denote corresponding parts throughout the several views: Figure 1 is a side elevation of a cooking utensil in accordance with this invention. Fig. 2 is a cross-sectional view, and, Fig. 3 is a plan view of the supporting plate for the solid or semi-solid food which is to be prepared.

Referring to the drawings in detail, 1 denotes an outer receptacle and 2 an inner receptacle which conforms in shape to the receptacle 1. The outer receptacle 1 is provided with a pair of handles 3 which are diametrically-opposed and arranged at the top of the said receptacle 1. The inner face of the bottom 4 of the receptacle 1 is provided with a series of upwardly-extending retaining pins 5 for a purpose to be presently referred to.

The inner receptacle 2 is formed of foraminous material and when positioned within the outer receptacle engages the inner face of said receptacle and through the bottom 6 of the inner receptacle project the pins 5 to prevent the shifting of the inner receptacle 2 when mounted within the outer receptacle 1. The inner receptacle 2 at its top is provided with a pair of handles 7 which are diametrically-opposed and said receptacle 2 has connected therewith a series of inwardly-extending lugs 8 forming seats for a perforated plate 9 which constitutes a support for the solid or semi-solid food. The lugs 8 are arranged in proximity to the center of the receptacle 2.

The manner in which the utensil is used is as follows: It will be assumed that soup is to be prepared and also a solid food,— the receptacle 2 containing the soup stock is placed within the receptacle 1 and the necessary amount of liquid is then added. The plate 9 is then positioned upon the lugs 8 and the solid or semi-solid food is placed on the plate 1. After the food has been cooked the inner receptacle 2 is removed carrying the remains of the soup stock therewith, the liquid draining through the receptacle 2 into the receptacle 1. After the receptacle 2 has been taken out of the receptacle 1, the solid or semi-solid food is then removed from the plate 9 or the plate 9 with the food thereon can be removed from the receptacle 2.

When the utensil is used for the cooking of a solid or semi-solid and a liquid food, the steam from the liquid food is utilized to cook the solid or semi-solid food mounted upon the plate 9, the perforations of the plate 9 allowing for the passage of the steam.

What I claim is:

A cooking utensil comprising an outer imperforate receptacle, an inner foraminous receptacle mounted within the outer receptacle, lugs projecting inwardly from the inner receptacle and constituting seats, a perforated plate mounted upon said seats, and upwardly-extending pins projecting from the inner face of the bottom of the outer receptacle and extending through the bottom of the inner receptacle to prevent the latter shifting in the former.

In testimony whereof I affix my signature in the presence of two witnesses.

MARY E. HOVEY.

Witnesses:
A. H. RABSAG,
K. H. BUTLER.